United States Patent [19]
Day

[11] 3,964,856
[45] June 22, 1976

[54] VACUUM MOULDING TECHNIQUES
[75] Inventor: Robert H. Day, Bracknell, England
[73] Assignee: Illinois Tool Works Inc., Chicago, Ill.
[22] Filed: June 16, 1975
[21] Appl. No.: 587,509

Related U.S. Application Data
[63] Continuation of Ser. No. 424,395, Dec. 13, 1973, abandoned.

[30] Foreign Application Priority Data
Dec. 19, 1972 United Kingdom............... 58608/72

[52] U.S. Cl.............................. 425/503; 425/387 R; 425/521
[51] Int. Cl.²......................................... B29C 17/04
[58] Field of Search............ 425/387 R, 387 B, 397, 425/503, 504, 521, DIG. 48, 388

[56] References Cited
UNITED STATES PATENTS
3,250,660 5/1966 Greig et al...................... 425/504 X
3,338,997 8/1967 Tigner............................. 425/388 X
3,357,053 12/1967 Lyon et al.................. 425/387 B X
3,709,967 1/1973 Held.................................. 425/388

Primary Examiner—Robert D. Baldwin
Attorney, Agent, or Firm—E. L. Benno; R. W. Beart

[57] ABSTRACT

Apparatus and method for thermoforming two or more plastics sheets simultaneously, to form in one operation a double-walled cup, or a composite walled cup, or a plurality of single-walled cups. The sheets are moved and heated simultaneously, the portion not being thermoformed being kept apart, permitting economy of scrap remelting. The thermoformed portions can be kept apart by pressure between the sheets, which can serve to hotform the sheets against respective mould surfaces, or air pressure can bond the sheets together. Existing machines need substantially only an additional clamping plate, heater, and compressed air passing through a radial port in a clamping plate, to incorporate the invention.

1 Claim, 12 Drawing Figures

VACUUM MOULDING TECHNIQUES

This is a continuation of application Ser. No. 424,395, filed Dec. 13, 1973, now abandoned.

This invention concerns techniques for thermoforming plastic sheets.

An established technique of moulding articles such as disposable plastic cups is to distend a heated sheet of the plastics material by differential pressure on its opposite sides, and cause the sheet to conform to the surface of a cavity. This can be assisted by a plunger which pushes the sheet into the cavity.

In relation to the deformation of the single sheet there has grown up a body of established and sophisticated techniques concerned with such matters as the shaping of the plunger, the coordination of the movement of the plunger with changes in differential pressure, the temperature of the sheet, and heating and/or cooling of the plunger, and/or of the cavity.

The present invention is concerned in a very general sense with the vacuum moulding of a plurality of sheets simultaneously, the sheets being in parallel, overlying relationship, and being deformed by the one plunger. While the present discussion limits itself to the deformation of merely two sheets, it is to be borne in mind that the techniques in principle are not limited to two. It is forseen that three and more sheets will be simultaneously deformable by the techniques of the present invention.

A first exemplary process embodying the invention is described below with reference to the vacuum moulding of a double walled cup. It is described with reference to the accompanying drawings, in which.

Figure 1:
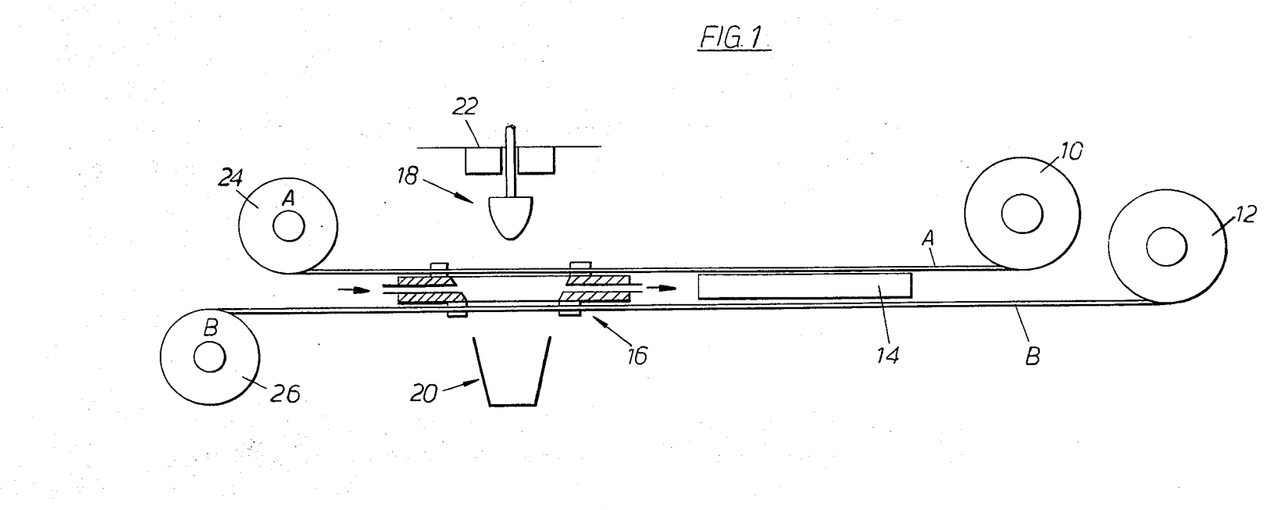
FIG. 1 is a fairly diagramatic layout of the main components of a vacuum moulding process.

Two sheets A and B for forming the inner and outer walls of a cup are supplied respectively from rolls 10 and 12. The material passes in successive stages past heaters shown diagramatically as 14, and arrives at the moulding station, where the heated sheets are gripped by clamps 16, whereupon a differential air pressure is established across the sheets to stretch them, and a plunger 18 descends to press the sheets into a cavity or die 20 and great pressure differential is then exerted on the sheet by compressed air and/or vacuum to cause the sheet to conform intimately with the die. A cut off die 22 cuts the material in the cavity from the rest of the sheets A and B. The die 20 retracts to permit the article formed to be moved on for further processing. The surrounding waste part of the sheets passes to the left and is received on rollers 24 and 26. During the moulding operation described, the next adjacent portion of the sheets was being heated, and as the waste material described is passing on to the rollers 24 and 26 the heated part is moving to lie between the plunger and the die. Apart from the plurality of the sheets, everything described in relation to FIG. 1 is already well known, as well as modifications such as mounting the heaters vertically to preheat descending sheets of material.

Figure 2:
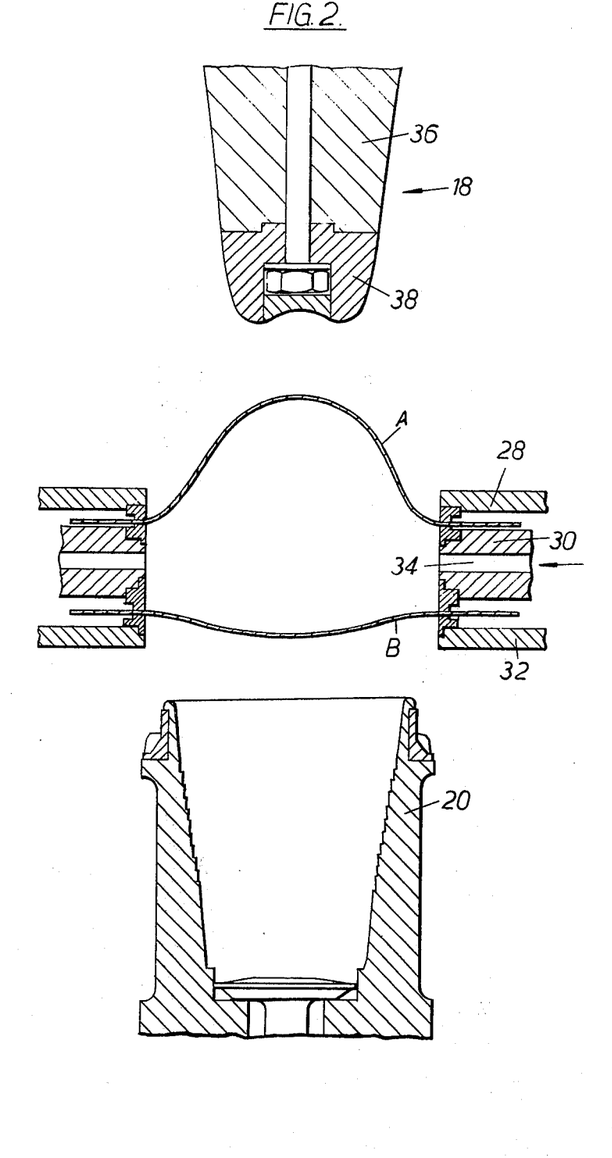
FIGS. 2 to 6 show sections through the cavity, sheets, and the clamps holding them. Successive Figures show different stages in the moulding of the cup.

In more detail, FIG. 2 shows the upper material A clamped between an upper clamp plate 28 and a middle clamp plate 30, and shows the lower material B clamped between the middle plate 30 and a lower clamp plate 32. Air at a pressure greater than atmospheric passes through ports 34 in the middle clamp plate and stretches the sheets outward, as seen in FIG. 2. The deformation will depend on the strength and temperature of the sheets; purposeful variation and control of these are known to readers skilled in this art; air at 5 p.s.i. has proved satisfactory.

The plunger 18 moves towards the distended sheets. In the particular arrangement shown, the plunger is composite, having a metal heat-conducting body 36 and a tip 38 of nylon or felt material. The body of the plunger has the precise form required of the inner wall of the cup.

Figure 3:
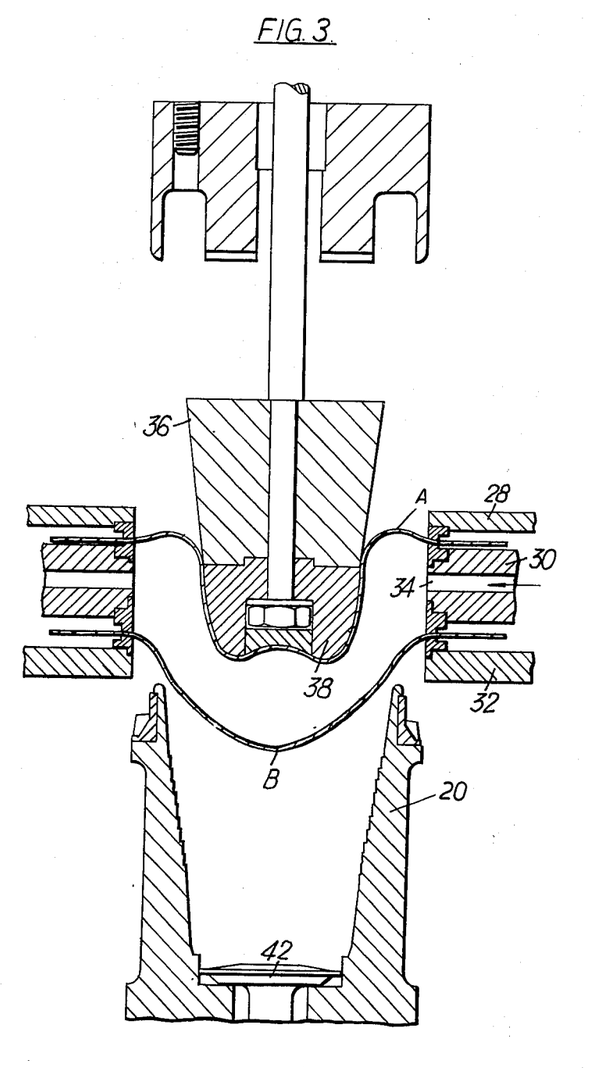

As seen in FIG. 3, with the pressure maintained between the sheets the plunger engages and deforms the upper sheet A and forces the lower sheet B into the cavity 20. It may well be necessary to slightly increase, decrease or vary the pressure between the sheets, to obtain the required behaviour of the two sheets. The cavity simultaneously rises slightly towards the clamping plates.

Figure 4:
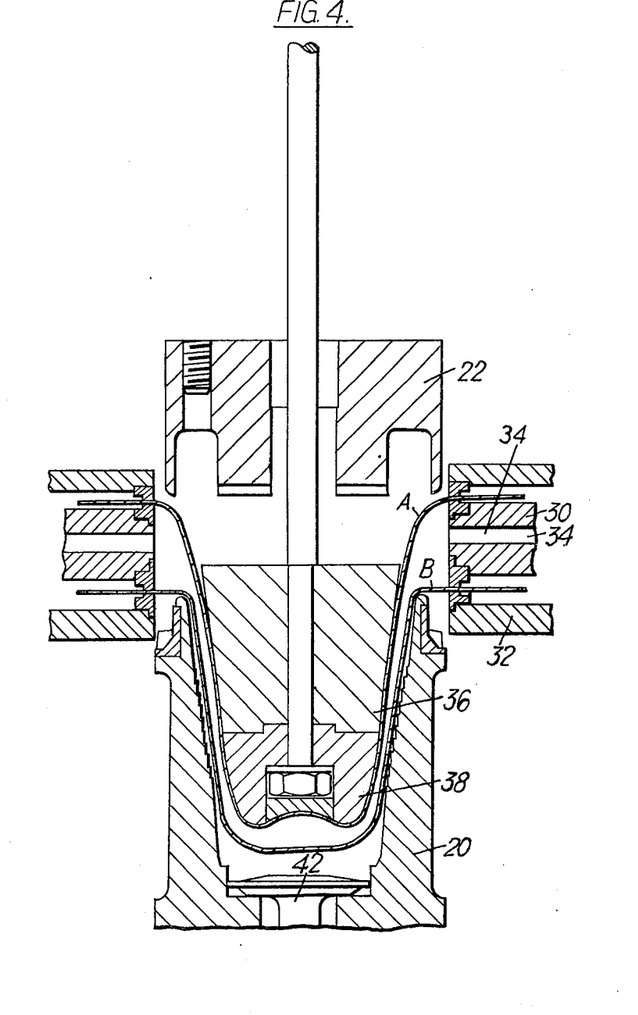

FIG. 4 shows an intermediate stage, at which the plunger is nearing the end of its stroke downwards. It is to be noted that a free space still exists between the two sheets within the cavity, and the space is in communication with the ports 34. At this stage the pressure between the sheets is increased, and causes the material B in the cavity to conform closely to the detailed shaping of the cavity wall, and the inner sheet A to conform closely to the form of the plunger. The shaping is not discussed in detail here. It is not part of this invention but is concerned, briefly, with forming serrations and steps which permit the cup to be gripped easily and to be stacked conveniently. An air pressure of 80–100 p.s.i. has proved satisfactory.

Figure 5:
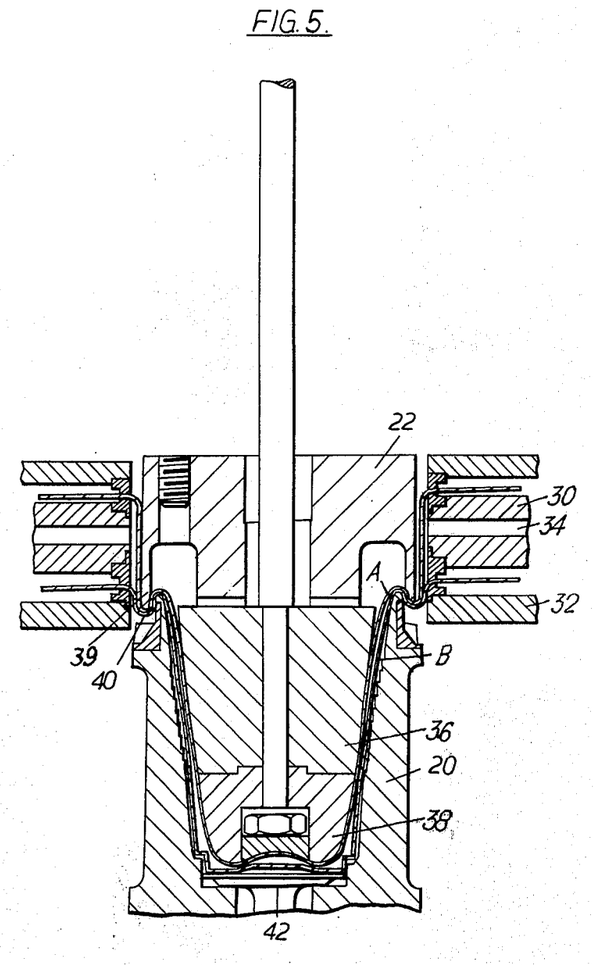
Figure 6:
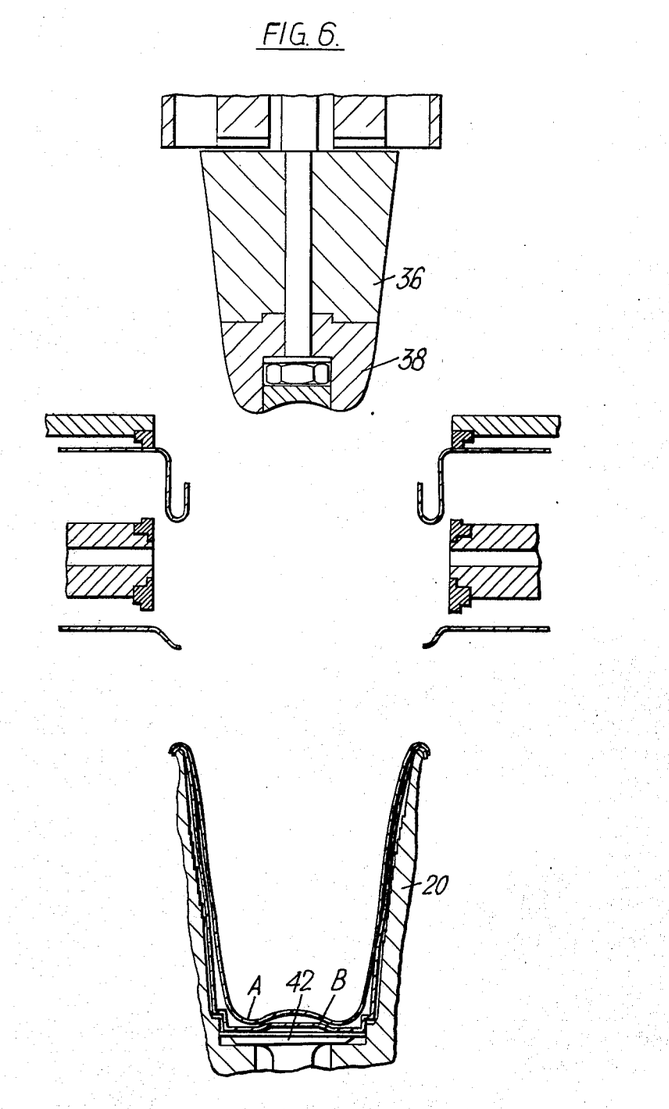
Figure 7:
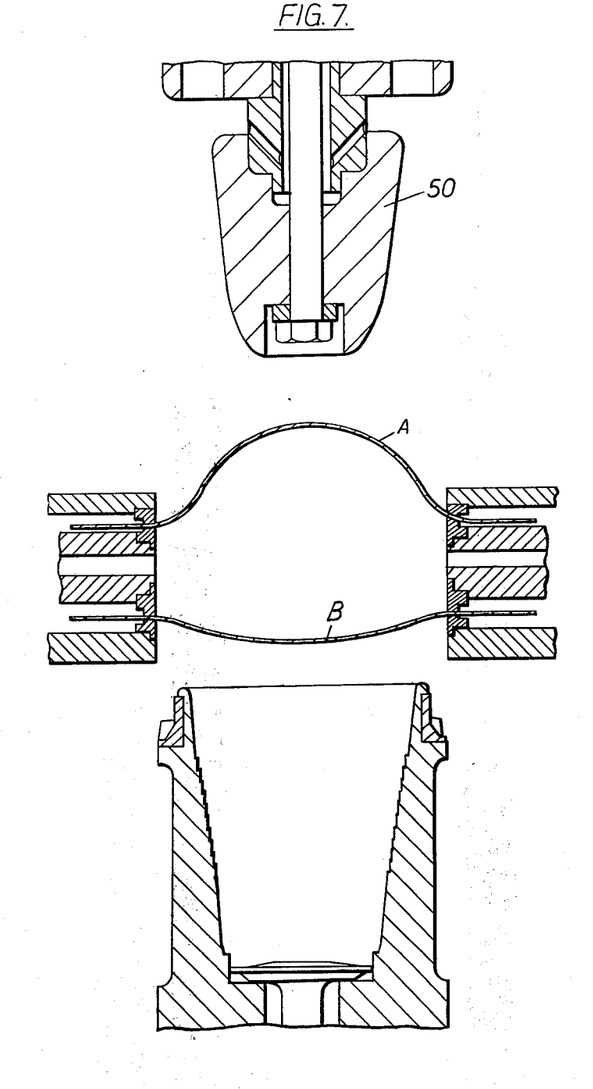

The pressure between the sheets is then exhausted to atmosphere. The material or materials of the sheets do not spring back because the temperature has permitted plastic flow. A cut-off die 22 then descends and engages the plunger. As seen in FIG. 5, it forces the plunger further into the cavity to expel air from the two sheets of material therein. A wall 39 on the die forces the two sheets to abut one another at the periphery 40, and further movement of the cut-off die 22 causes it to engage the cut off ring by shearing through the sheets. Air is then directed through the plunger to release the formed "pieces", and the plunger and cut-off die rise towards their initial position. The die 20 retracts downwards, leaving the two pieces standing on a knockout 42, as seen in FIG. 6, ready for passing to an edge-beading process. The three clamp plates separate vertically, permitting the materials A and B to move to the left as described, ready for the next identical moulding operation.

The existing technique for making double walled cups has involved making the inner and the outer separately, and assembling them afterwards. That obviously involves two moulding operations, halving the rate of manufacture compared to the process described.

The sheets A and B can be of the same or different material and their temperature can be controlled independently. The waste material is also kept separate for reprocessing.

It is appreciated that the new technique described can call for rethinking of the possible shapes of the walls, the plunger and the cavity. The cooling of the sides of the inner must be achieved by the plunger, whereas the nose of the plunger needs to be warm to improve flow of the inner material. It will also be necessary to shape appropriately the nose of the plunger to support the inner material if the pressure between the sheets during the plunger movement is increased.

It will be necessary to coordinate the release of pressure from between the sheets, and the descent of the cut-off die, to ensure that the air pressure between the two walls is sufficiently reduced before the two walls become bonded at their peripheries.

A second process embodying the present invention is described with reference to FIGS. 7 to 12, which again show successive stages in a single continuous cycle of a vacuum moulding operation.

The purpose of the second technique is to produce a single wall cup, but the wall of which is of two different materials. The outer material, being the lower sheet B, can be of a strong cheap plastics such as polystyrene, whereas the upper sheet might be chosen for its particular properties, for example high vapour impermeability, high stress crack resistance.

The operational steps in the second process which have already been described in detail in relation to the first are not repeated here; they are clear from the drawings.

Figure 8:
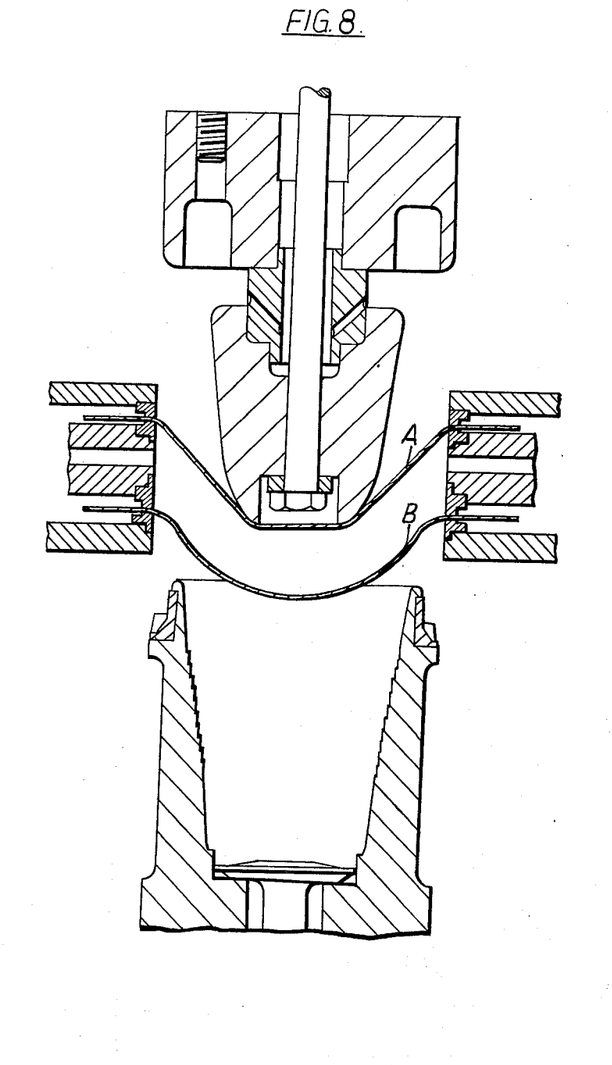
Figure 9:
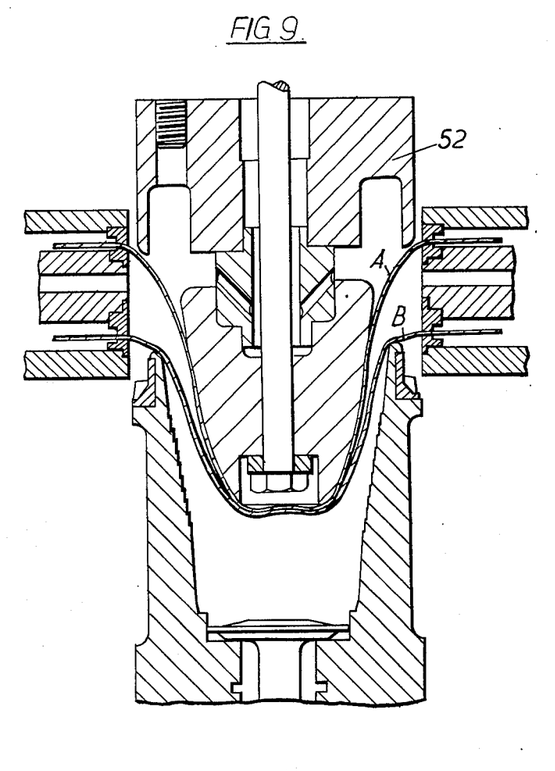

The two materials, after heating, are clamped between the three clamp plates so that the thinner material, having special properties, is uppermost. The pressure between the sheets is increased to stretch one or both of the sheets. A plunger 50, the shape of which is substantially unimportant, (distinct from the importance attached to the shaping of the plunger in the first operation), descends, engages the upper material, and moves towards the second material, forcing them both into the cavity, which itself is moving upwards to receive them, as seen in FIG. 8.

At a suitable time, the space between the sheets is exhausted to atmosphere and might be reduced slightly so that the plunger moves the abutting sheets into the cavity.

Figure 10:
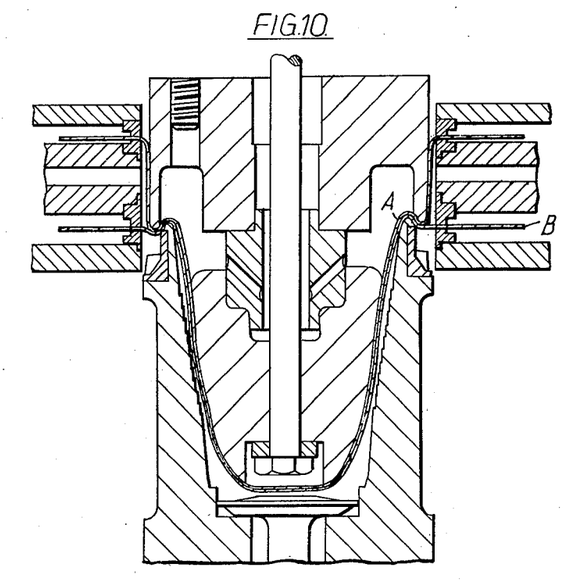
Figure 11:
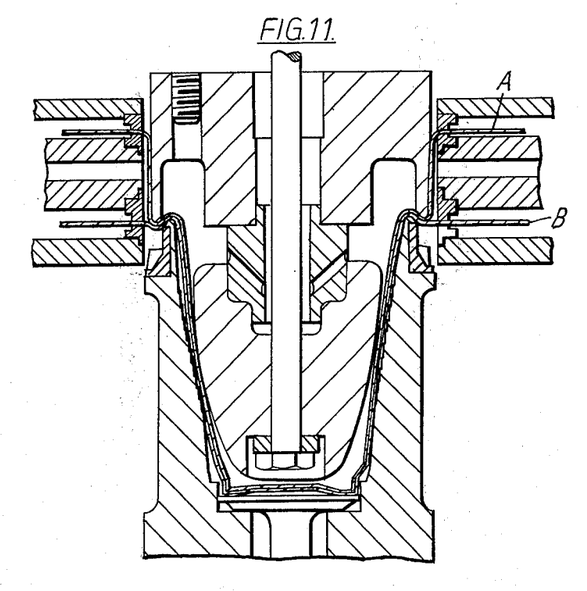
Figure 12:
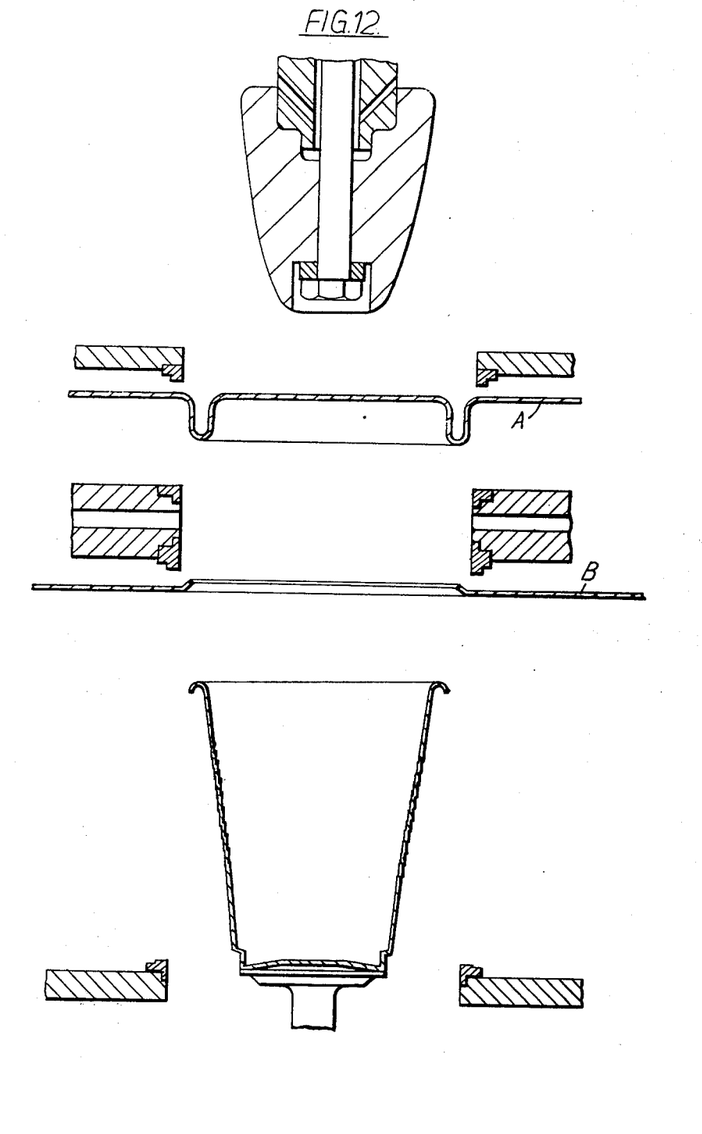

A cutting die ring 52 is rigidly fastened to and carried by the plunger and at a suitable time, as shown in FIG. 10, firmly seals against the two peripheries of the materials in the cavity. It is noted that both sheets conform to the plunger and abut one another over their entire areas. Pressurised air admitted through a port 54 in the plunger then expands the two materials off the plunger and into close conformity with the cavity, as in the usual forming process for a single sheet. Further movement downwards of the combined plunger and cutting die cuts off the materials, whereupon the plunger and the die retract as described above, the formed cup is ejected and the remaining lengths of material A and B move to the left, the waste going seperately to respective rolls, each for granulating and remoulding.

Known composite wall cups have been made of preformed composite sheets, and the waste, amounting to 50 to 60% of the original material, cannot be reprocessed it the two materials are incompatible for extrusion.

Broadly defined, a method of moulding an article, in accordance with the present invention, which article has at least two continuous walls of plastics material or materials overlying one another, comprises positioning two sheets of the material or materials in the appropriate order between a deforming means and a die, the materials being heated to be deformable, and operating the deforming means to move the sheets into the die.

Preferably air is forced into the space between the sheets to distend at least one of the sheets before the plunger deforms it. Whether or not the pressure is maintained or varied between the sheets during the plunger movement depends on the characteristics of the material and the form required of the article moulded.

The deforming means can be a plunger, as described in the two particular cases above. An important alternative however, is for the plunger to be replaced by a plate which descends on the upper sheet pressing to seal it around a continuous edge. Pressurised air then passes through a nozzle in the plate to extend the sheets into the cavity.

An outstanding advantage of the present invention is that it can be easily incorporated into existing moulding machines which have been forming single wall cups. The only essential modifications are the provision of three clamp plates, one of which has a radial port, and means for transporting and heating a further sheet of material. These modifications involve little capital outlay.

Although the invention has been described only in relation to double or composite wall cups, it is forseen that the techniques described are applicable to forming single-walled articles. The plurality of the articles could be moulded by a single plunger stroke, by having an appropriate number of sheets and clamping plates between the plunger and the die. It may be preferable to control the pressure between the different sheets independently of one another, and to suitably modify such details as the shape and operation of the cut-off ring.

It will probably be desirable to increase the length of the plunger so that it backs up the inner sheet to withstand the high pressure, and to remove the inner unnecessary parts of the cut-off die.

I claim:

1. Apparatus for molding open-ended containers from two sheets of thermoplastic material, said apparatus comprising three annular clamp plates mounted in a vertically stacked parallel arrangement and movable in parallel in a vertical direction to clamp said sheet material therebetween, means for holding a first roll of one thermoplastic sheet material, a first waste roller, the sheet material from said first roll adapted to extend horizontally between the middle and upper clamp plates of said three clamp plates for feeding said one sheet material from said first roll horizontally between the middle and upper clamp plates of said three clamp plates when said middle and upper clamp plates are vertically separated, means for holding a second roll of a second thermoplastic sheet material, a second waste roller, the sheet material from said second roll adapted to extend horizontally between the middle and lower clamp plates of said three clamp plates for feeding said second sheet material from said second roll horizontally between the middle and lower clamp plates of said three clamp plates when said middle and lower clamp plates are vertically separated, heating means for heating said one and said second sheet material from said first and second rolls, said heating means mounted horizontally between said rolls and said three clamp plates to heat said one and said second sheet material, an open-ended thermoforming die mounted with the open end thereof below and concentrically within said lower clamp plate and movable relative to said three clamp plates in a vertical direction, a thermoforming plunger mounted above and concentrically within said upper clamp plate and vertically movable to engage and force said one and said second sheet material clamped between said three clamp plates downwardly into said thermoforming die, an annular cutoff die mounted above and concentrically about said plunger and selectively movable independently of said plunger through said three clamp plates and into cooperation with the open end of said thermoforming die to selectively clamp and cut off the portions of said one and said second sheet material within said three clamp plates, said middle clamp plate having an air port for selective application of air under pressure between said one and said second sheet material clamped between said three clamp plates, and air port means formed between said cutoff die and said plunger for selective application of air under pressure to the upper side of said one of said one and said second sheet material when said cutoff die cooperates with said open end of said thermoforming die.

* * * * *